(12) United States Patent
Esnault et al.

(10) Patent No.: US 7,380,579 B2
(45) Date of Patent: Jun. 3, 2008

(54) METAL CABLE USABLE IN A TIRE CARCASS REINFORCEMENT

(75) Inventors: Philippe Esnault, Greenville, SC (US); Le Tu Anh Vo, Guyancourt (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/850,862

(22) Filed: May 21, 2004

(65) Prior Publication Data

US 2005/0003185 A1   Jan. 6, 2005

Related U.S. Application Data

(63) Continuation of application No. PCT/EP02/13708, filed on Dec. 4, 2002.

(30) Foreign Application Priority Data

Dec. 7, 2001   (FR) .................. 01 15889

(51) Int. Cl.
*B60C 9/02* (2006.01)
*D02G 3/48* (2006.01)

(52) U.S. Cl. ............... 152/451; 152/548; 152/556; 57/210; 57/224; 57/230; 57/902; 428/364; 428/365; 428/375; 428/377; 428/379

(58) Field of Classification Search ............... None
See application file for complete search history.

(56) References Cited

U.S. PATENT DOCUMENTS 4,999,416 A * 3/1991 Kaminade et al. .......... 528/190
5,410,868 A * 5/1995 Sakon ..................... 57/213
6,539,698 B2 * 4/2003 Fidan et al. ............... 57/6
6,550,507 B1 * 4/2003 Esnault et al. ............ 152/48

FOREIGN PATENT DOCUMENTS

| EP | 0568271 | * | 11/1993 |
| JP | 04266506 | * | 9/1992 |
| JP | 9-175111 | * | 7/1997 |

OTHER PUBLICATIONS

Abstract of KR 9504085.*

* cited by examiner

*Primary Examiner*—Justin Fischer
(74) *Attorney, Agent, or Firm*—Cohen Pontani Lieberman & Pavane LLP

(57) ABSTRACT

The present invention relates to a metal cable usable for reinforcing a carcass reinforcement for a tire, such as a heavy-vehicle tire, to a composite fabric usable as a ply for such a carcass reinforcement, to a carcass reinforcement comprising this fabric and to a tire incorporating this carcass reinforcement.

A metal cable according to the invention comprises a textile wrap, and is such that said wrap is formed of an aromatic thermotropic polyester or polyester amide.

A composite fabric according to the invention is such that it comprises a rubber composition which is reinforced by said cables.

A tire according to the invention has its carcass reinforcement comprising said composite fabric.

11 Claims, No Drawings

METAL CABLE USABLE IN A TIRE CARCASS REINFORCEMENT

The present application is a continuation of PCT/EP02/13708, titled "Metal Cord for Use in a Tyre Carcass Reinforcement," filed 4 Dec. 2002, listing as inventors Philippe Esnault and Le Tu Anh Vo, published in French under PCT Article 21(2) as WO 03/048447 on 12 Jun. 2003, claiming priority to French national applications 01/15889 filed 7 Dec. 2001.

The present invention relates to a metal cable usable for reinforcing a carcass reinforcement for a tire, such as a heavy-vehicle tire, to a composite fabric usable as a ply for such a carcass reinforcement, to a carcass reinforcement comprising this fabric and to a tire incorporating this carcass reinforcement.

Generally, the reinforcement elements which are used in the composite fabrics of carcass reinforcements for heavy-vehicle tires are formed of metal cables, comprising for example a plurality of layers of wires or a plurality of strands which are wound together in a helix at variable pitches. The wires usually have a diameter of between 0.05 mm and 0.40 mm, and they are for example made of perlitic steel, the carbon content of which is of between 0.35% and 1.2%. These wires are obtained by work-hardening, having been coated beforehand with a fine layer of a metal (such as brass, zinc or bronze) to promote said work-hardening and/or the adhesion to the rubber composition used in said composite fabric.

When the running of a heavy-vehicle tire involves buckling stresses for the cables which it comprises in its carcass reinforcement and, all the more so, when this running is at a reduced or zero internal pressure, experience shows that these cables are greatly flexed, such that they tend to buckle and open to form what the person skilled in the art refers to as "bird cages". These cables may then break prematurely, thus determining the endurance limit when the heavy-vehicle tire is travelling "flat".

In order to delay this buckling of the carcass reinforcement cables, it has been proposed to add to each cable a wrapping wire of reduced diameter (conventionally of between 0.10 mm and 0.25 mm) wound in a helix on the outer surface of the cable. Generally, this wrapping wire is wound in a very low pitch (for example of from 3 mm to 5.5 mm) and in a direction opposite or identical to the direction of winding of the wires of said outer layer.

The wrapping wire is generally formed of the same metallic material as that of the wires of the cable (i.e., of perlitic steel).

Although it is established that a metal wrap of this type does improve the compressive strength and buckling strength of the cable, it is known that it causes a great amount of wear by fretting of the outermost wires of said cable. This wear by fretting involves relative deterioration of the endurance of the cables in comparison with that of non-wrapped cables, which contributes to adversely affecting the endurance when the tire incorporating these cables is running "flat".

This is why in the past wrapping wires of a nature other than that of the wires of the cable have been tested, which are capable of minimizing this wear by fretting while imparting satisfactory compressive strength and buckling strength to the cable.

French patent specification FR-A-1 011 211 discloses a wrapped metal cable for tires which is intended to have satisfactory resistance to the buckling forces during normal travel. This cable is provided with a wrap of natural or synthetic textile material which is formed of a thread or a strip.

French patent specification FR-A-2 551 104 discloses a wrapped metal cable for tires which is intended to reduce wear by fretting by the wrap. This cable is of multilayer type, and the wrap used is formed of a thread of flattened section made of plastics material or of rubber, or alternatively of a metal/plastics material or metal/rubber composite.

German patent specification DE-A-4 120 554 discloses a metal cable provided with a non-metallic wrap which retracts in the hot state, to reduce the corrosion and wear by contact between the wrap and the outer layer of the cable. This wrap may be formed of a polyamide or a polyester.

South Korean patent specification KR-B-95/04085 discloses a steel cable provided with a non-metallic wrap which is formed of one or more cables. This wrap may be selected from among a family of polymers, whether textile or not, comprising nylon®, polyethylene, polyurethane, rayon, glass fiber, carbon fiber and an aromatic polyamide having the trade name Kevlar®.

European patent specification EP-A-566 392 discloses a metal cable for tires, which is provided with a wrapping wire of flattened section, in order to reduce the thickness of the cable and of the reinforcement ply incorporating it, while imparting improved mechanical properties thereto. This wrapping wire may be equally well metallic or made of plastics material, for example of aramid or of nylon®, or alternatively of a metal/plastics composite.

Japanese patent specification JP-A-94/191 207 discloses a metal cable for a crown ply of a tire, which is provided with a wrap intended to impart satisfactory adhesion of this cable to the rubber, and also improved endurance with respect to the separation of said ply. This wrap is formed of a single thread, of a plurality of threads or of a strip, and is preferably made of nylon®, rayon, or cotton in order to optimise the aforementioned adhesion, or even of polyvinyl alcohol (PVA) or a polyester.

One disadvantage of these cables which are provided with a textile wrap lies in the relatively reduced endurance when travelling on a flat tire which they impart to a tire, such as a heavy-vehicle tire, the carcass reinforcement of which is provided therewith, in particular in comparison with the endurance obtained with cables provided with a metal wrap.

The object of the present invention is to overcome this drawback, and it is achieved in that the Applicant has recently surprisingly discovered that a textile wrap of thermotropic aromatic polyester or polyester amide, makes it possible to increase very significantly the mileage travelled, when travelling with a flat tire, by a tire incorporating a metal cable which comprises said wrap as the reinforcement element for its carcass reinforcement, compared with the mileage obtained under the same conditions using a wrap of identical geometry which is formed of a metal or another textile, such as aramid, by imparting to this cable according to the invention a mechanical strength which is improved with respect to the compressive stresses and high flexing of which the carcass reinforcement is the seat under these travelling conditions with a flat tire, without adversely affecting the resistance of this cable according to the invention with respect to the wear by fretting compared with that of cables provided with an aramid wrap.

In the present application, the expression "metal cable" will be understood to mean a cable, at least the outer surface of which on which said wrap is wound is metallic in nature (i.e., the outer surface of which is formed of metallic wires or assemblies of wires).

Advantageously, the wrapped cable according to the invention is used as a reinforcement element for a carcass reinforcement for a heavy-vehicle tire.

The starting polymer which is used to obtain the wrap according to the invention is any thermotropic aromatic polyester or polyester amide (i.e., in liquid crystal form in the molten state), which can be spun in this molten state.

In known manner, the thermotropic nature of a polymer is determined by optical measurement, by testing the optical anisotropy of this polymer by observation in the molten phase (i.e., above the melting temperature of the polymer) of a drop of said polymer between the crossed linear polarizer and analyzer of an optical polarizing microscope, at rest, that is to say in the absence of dynamic stress.

If the preparation above is optically anisotropic, that is to say, depolarizes light when placed between the crossed linear polarizer and analyser (it thus transmits light, imparting thereto a more or less coloured texture), then the polymer tested is said to be thermotropic.

Conversely, if said preparation is optically isotropic under the same observation conditions, and does not have this property of depolarisation (the field of the microscope remaining black), then the polymer tested is not thermotropic.

Such thermotropic polyesters or polyester amides, which are known to the person skilled in the art, are said to be "entirely aromatic" and have been described in a large number of documents.

Mention will be made, for example, of the patent specifications EP-A-91 253, EP-A-205 346, EP-A-267 984, EP-A-508 786, EP-A-737 707, U.S. Pat. No. 3,491,180, U.S. Pat. No. 4,083,829, U.S. Pat. No. 4,161,470, U.S. Pat. No. 4,183,895, U.S. Pat. No. 4,447,592, U.S. Pat. No. 4,734,240, U.S. Pat. No. 4,746,694, U.S. Pat. No. 5,049,295, U.S. Pat. No. 5,110,896, U.S. Pat. No. 5,250,654, U.S. Pat. No. 5,296,542, JP-A-92/333 616, JP-A-96/260 242.

Preferably, a specific thermotropic aromatic polyester is used, which consists essentially of recurrent units (A) of 6-oxy-2-naphthoyl and (B) of 4-oxybenzoyl, the molar ratio A/B being within a range from 10:90 to 90:10, preferably from 20:80 to 30:70.

This thermotropic aromatic polyester is sold in particular by Hoechst Celanese under the name "VECTRA" with a molar ratio A:B equal to 27:73, and has been described in patent specification U.S. Pat. No. 4,161,470.

It may be obtained by copolymerisation of p-hydroxybenzoic acid and 6-hydroxy-2-naphthoic acid, these two acids possibly being substituted. It has, in known manner, an excellent compromise of properties in terms of heat resistance, chemical resistance, ease of working and suitability for spinning, owing in particular to a relatively low melting point.

The wrap according to the invention may be formed of a single thread, or of a plurality of threads twisted together to form a plied yarn (conventionally known by the name of "cord" or "plied yarn" in English), it being understood that in the present description the term "thread" may also designate:

a multifilament fiber formed of elementary filaments of low diameter which are parallel to each other, a spun yarn based on a multitude of such elementary filaments which are twisted together (for example a spun yarn based on around a hundred elementary filaments, each having a diameter close to about ten microns), or a single monofilament.

"Monofilament" is understood to mean a unit filament, the diameter or thickness D of which (that is to say, the smallest transverse dimension of its cross-section when this is not circular), is at least equal to 40 μm (minimum linear density of 1.7 tex). This definition therefore covers equally well monofilaments of essentially cylindrical shape (i.e., with a circular cross-section), oblong monofilaments and monofilaments of flattened shape or even bands or films of thickness D.

According to a preferred example of embodiment of the invention, said wrapping thread is formed of a monofilament.

Reference will be made to international patent specifications WO-A-92/12018 and WO-A-98/55674 for the general conditions for obtaining such a monofilament by spinning, and also any post-polycondensation heat treatment (which makes it possible to increase the degree of polymerization of the starting polymer and thus to increase the tenacity of the monofilament).

In the raw spinning ("as-spun") state, this monofilament has the characteristic of not contracting when hot, which is expressed by the relationship $\Delta L \geq 0$, $\Delta L$ representing its variation in length (in %) after 2 minutes at 235±5° C., under an initial tension of 0.2 cN/tex. Reference will also be made to this document WO-A-98/55674 for the conditions of measurement of this thermal variation in length. All the mechanical properties below are measured on monofilaments which have undergone prior conditioning, that is to say storage (after drying) before measurement, in a standard atmosphere in accordance with European Standard DIN EN 20139 (temperature of 20±2° C. and relative humidity of 65±2%) for at least 24 hours.

The linear density of the monofilaments is determined on at least three samples, each corresponding to a length of 50 m, by weighing this length of monofilament. The linear density is given in tex (weight in grams of 1000 m of monofilament—reminder: 0.111 tex equals 1 denier).

The mechanical properties in extension (tenacity, initial modulus and elongation at break) are measured in known manner using a Zwick GmbH & Co (Germany) 1435-type or 1445-type tension machine. The monofilaments are subjected to traction over an initial length of 400 mm at a nominal speed of 50 mm/min. All the results given in the rest of the present description are an average of 10 measurements.

The tenacity (breaking load divided by linear density) and the initial modulus are indicated in cN/tex (reminder: 1 cN/tex=0.11 g/den). The initial modulus is defined as the gradient of the linear part of the force-elongation curve, which occurs just after a standard initial tension of 0.5 cN/tex. The elongation at break is indicated as a percentage.

The diameter D of the monofilaments is determined by calculation from the linear density of the monofilaments and their density, in accordance with the formula:

$$D = 2 \times 10^{1.5} [Ti/\pi\rho]^{0.5}$$

D being expressed in μm, Ti being the linear density (tex), and ρ being the density in g/cm$^3$.

In the case of a monofilament having a non-circular cross-section, that is to say one which is other than a monofilament of essentially cylindrical shape, the parameter D, which then represents the smallest dimension of the monofilament in a plane normal to the axis of the latter, is determined not by calculation but experimentally, by optical microscopy on a cross-section of this monofilament, the latter being, for example, coated in a resin beforehand to facilitate cutting.

The wrap usable in a cable according to the invention preferably has a diameter or a thickness of from 0.08 mm to 0.40 mm.

Preferably, the wrap according to the invention has a linear density of less than 50 tex and preferably less than 30 tex.

Also preferably, this wrap has a tenacity greater than 180 cN/tex, an initial modulus greater than 3500 cN/tex, and an elongation at break greater than 2.5%.

It will be noted that this high initial modulus makes it possible to ensure a good wrapping function for the cable according to the invention, and that this high tenacity makes it possible to maintain a reduced diameter for the wrap compared with that of said cable.

Also preferably, the wrap of the cable according to the invention is wound in a helix on said outer surface in a pitch of from 3 mm to 5.5 mm.

Advantageously, the wrap according to the invention is subjected to a sizing treatment, in order to permit its adhesion to the rubber composition intended to be joined to the cables which are each provided with this wrap.

According to one example of embodiment of the invention, said cable is of the multilayer type.

This cable comprises an inner layer or core, which is formed of a unit straight wire or of a plurality of wires of diameters which may be identical or different, which are parallel to each other or are wound together in a helix in a given pitch, this inner layer being surrounded by a metallic outer layer formed of wires of diameters which may be identical or different which are wound together in a helix in another given pitch, an intermediate layer being provided or not being provided between said inner and outer layers, and the wrap according to the invention being wound on said outer layer in a direction opposite or identical to that of the wires thereof.

Thus, such a multilayer cable may correspond for example to the formula (L+M) or (L+M+N), being formed of a core of L wire(s) which is surrounded by at least one layer of M wires which is itself possibly surrounded by an outer layer of N wires, with generally L varying from 1 to 4, M varying from 3 to 12 and N varying from 8 to 20.

Such multilayer cables, assembled by the known technique of cabling, have been described in a very large number of publications. Reference will be made in particular to the documents U.S. Pat. No. 3,922,841; U.S. Pat. No. 4,158, 946; U.S. Pat. No. 4,488,587; EP-A-168 858; EP-A-176 139 or U.S. Pat. No. 4,651,513; EP-A-194 011; EP-A-260 556 or U.S. Pat. No. 4,756,151; EP-A-362 570; EP-A-497 612 or U.S. Pat. No. 5,285,836; EP-A-568 271; EP-A-648 891; EP-A-669 421 or U.S. Pat. No. 5,595,057; EP-A-709 236 or U.S. Pat. No. 5,836,145; EP-A-719 889 or U.S. Pat. No. 5,697,204; EP-A-744 490 or U.S. Pat. No. 5,806,296; EP-A-779 390 or U.S. Pat. No. 5,802,829; EP-A-834 613; WO98/41682; RD (*Research Disclosure*) No. 34054, August 1992, pp. 624-633; RD No. 34370, November 1992, pp. 857-859.

According to one embodiment of the invention, these multilayer cables correspond to one or the other of the aforementioned formulae (L+M) or (L+M+N) with L=1, such that they comprise a core formed of a single "straight" wire.

Without limitation, mention may be made, for example, of cables of formula:

(1+5),(1+6),(1+5+10),(1+5+11),(1+5+12),(1+6+10),
(1+6+11),(1+6+12),(1+7+11),(1+7+12),(1+7+13).

According to another preferred embodiment of the invention, these multilayer cables correspond to one or the other of said formulae (L+M) or (L+M+N) with L being greater than 1, and they then comprise a core formed of a plurality of wires assembled in parallel (i.e., in an infinite pitch) or alternatively wound together in a helix in a finite pitch.

In this latter case, mention may be made, still without limitation, of cables of formula:

(2+7),(3+8),(3+9) or (3+9+15), for example.

According to a preferred example according to the invention, mention may be made of wrapped cables of formula:

−(3+9).0.18+0.15 with the pitches (in mm):6.5/12.5/3.5 and the directions of twist: SSZ (cable comprising an inner layer of 3 metal wires and an outer layer of 9 metal wires, on which is wound in the opposite direction a wrap of a diameter of 0.15 mm in a pitch of 3.5 mm, the wires of the cable each having a diameter of 0.18 mm); and −(3+9+15).0.23+0.15 with the pitches (mm):6.5/12.5/18/3.5 and the directions of twist SSZS (cable comprising an inner layer of 3 metal wires, an intermediate layer of 9 metal wires and an outer layer of 15 metal wires, on which is wound in the opposite direction the wrap of a diameter of 0.15 mm in a pitch of 3.5 mm, the wires each having a diameter of 0.23 mm).

It will be noted that the cables according to the invention may be not only multilayer cables, but also any cables which are at least partially metallic of stranded type (assembled by the technique of stranding, which is also known).

A composite fabric according to the invention comprises a rubber composition which is reinforced by the wrapped cables according to the invention, and this fabric can be used as the carcass reinforcement ply for a tire, advantageously for a heavy-vehicle tire.

This rubber composition is based on (i.e., formed of) at least one diene elastomer and comprises, in addition to this diene elastomer, all the conventional ingredients such as reinforcing filler, cross-linking system and other additives usable in rubber compositions for tires.

"Diene" elastomer is understood to mean, in known manner, an elastomer resulting at least in part (i.e., a homopolymer or a copolymer) from diene monomers, that is to say from monomers bearing two double carbon-carbon bonds, whether conjugated or not.

In general, "essentially unsaturated" diene elastomer is understood here to mean a diene elastomer resulting at least in part from conjugated diene monomers, having a content of members or units of diene origin (conjugated dienes) which is greater than 15% (mol %). Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean in particular a diene elastomer having a content of units of diene origin (conjugated dienes) which is greater than 50%.

These definitions being given, the diene elastomer of the composite according to the invention is preferably selected from among the group consisting of polybutadienes, natural rubber, synthetic polyisoprenes, the various butadiene copolymers, the various isoprene copolymers and mixtures of these elastomers.

Of the polybutadienes, in particular those having a content of −1,2 units of between 4% and 80% or those having a content of cis-1,4 greater than 80% are suitable. Of the synthetic polyisoprenes, in particular cis-1,4-polyisoprenes, preferably those having an amount of cis-1,4 bonds greater than 90%, are suitable. Among the butadiene or isoprene copolymers, these are understood to be in particular the copolymers obtained by copolymerisation of at least one of these two monomers with one or more vinyl-aromatic compounds having from 8 to 20 carbon atoms. Suitable vinyl-aromatic compounds are, for example, styrene, ortho-, meta- and para-methylstyrene, the commercial mixture "vinyltoluene", para-tert. butylstyrene, methoxystyrenes, chlorostyrenes, vinylmesitylene, divinylbenzene and vinylnaphthalene. The copolymers may contain between 99% and 20% by weight of diene units and between 1% and 80% by weight of vinyl-aromatic units. Of the butadiene or isoprene copolymers above, mention will preferably be made of butadiene/styrene copolymers, isoprene/butadiene copolymers, isoprene/styrene copolymers or isoprene/butadiene/styrene copolymers.

In summary, preferably a diene elastomer selected from the group of highly unsaturated diene elastomers consisting of polybutadienes (BR), natural rubber (NR), synthetic polyisoprenes (IR), butadiene/styrene copolymers (SBR), isoprene/butadiene copolymers (BIR), isoprene/styrene copolymers (SIR), butadiene/styrene/isoprene copolymers (SBIR) and mixtures of these elastomers is suitable.

Even more preferably, a diene elastomer formed of natural rubber or of a synthetic polyisoprene is suitable in a majority proportion (i.e., more than 50% by weight) in the elastomeric matrix of the rubber composition according to the invention.

However, it is also possible, in accordance with another advantageous embodiment of the invention, to use blends (mixtures) of these polyisoprenes with other highly unsaturated diene elastomers, in particular with SBR or BR elastomers as mentioned above.

Of course, the rubber matrices of the composites of the invention may contain a single or several diene elastomer(s), the latter possibly being used in association with any type of synthetic elastomer other than a diene elastomer, or even with polymers other than elastomers, for example thermoplastic polymers.

The rubber compositions of the composite fabrics according to the invention also comprise all or some of the additives usually used in the manufacture of tires, such as reinforcing fillers such as carbon black or silica, anti-ageing agents, for example antioxidants, extender oils, plasticisers or agents which facilitate processing of the compositions in the uncured state, a cross-linking system based on either sulfur, or sulfur and/or peroxide donors, accelerators, vulcanization activators or retarders, methylene acceptors and donors, resins, known adhesion-promoting systems of the type "RFS" (resorcinol/formaldehyde/silica) or metal salts, in particular cobalt salts.

The composite fabric according to the invention may be present in varied forms, for example in the form of a ply, a band, strip or a block of rubber in which there is incorporated the metallic reinforcing member using different means known to the person skilled in the art, such as for example molding, calendering or extrusion means.

It will be noted that the composite fabric according to the invention imparts very particularly to a heavy-vehicle tire improved endurance during travel with a flat tire.

A carcass reinforcement of a tire according to the invention, such as a heavy-vehicle tire, comprises this composite fabric, and a tire according to the invention comprises this carcass reinforcement.

The aforementioned characteristics of the present invention, as well as others, will be better understood on reading the following description of several examples of embodiment of the invention, which are given by way of illustration and not of limitation.

DESCRIPTION OF THE ENDURANCE TESTS PERFORMED

I. Undulating Traction Test:

The "undulating traction" test is a fatigue test well-known to the person skilled in the art, in which the material tested is fatigued in a pure uni-axial extension (extension-extension), that is to say without compressive stress. The principle is as follows.

A sample of the cable to be tested, which is held at each of its two ends by the two jaws of a traction machine, is subjected to a tensile or extensional stress, the intensity σ of which varies cyclically and symmetrically ($\sigma_{avg} \pm \sigma_a$) about an average value ($\sigma_{avg}$), between two extreme values $\sigma_{min}$ ($\sigma_{avg} - \sigma_a$) and $\sigma_{max}$ ($\sigma_{avg} + \sigma_a$) surrounding this average value, at a given ratio of load "R"=($\sigma_{min}/\sigma_{max}$). The average stress ($\sigma_{avg}$ is therefore linked to the ratio of load R and to the amplitude $\sigma_a$ by the relationship $\sigma_{avg}=\sigma_a(1+R)/(1-R)$.

In practice, the test is performed as follows.

A first amplitude of stress $\sigma_a$ is selected (generally within a range of the order of ¼ to ⅓ of the resistance Rm of the cable) and the fatigue test is started for a maximum number of $10^5$ cycles (frequency 30 Hz), the load ratio R being set to 0.1.

Depending on the result obtained—i.e., breaking or non-breaking of the cable after this maximum of $10^5$ cycles—a new amplitude $\sigma_a$ is applied (less or greater than the previous one, respectively) to a new test piece, by varying this value $\sigma_a$ in accordance with the so-called steps method (Dixon & Mood: Journal of the American statistical association, 43, 1948, 109-126).

Thus a total of 17 iterations are effected, the statistical treatment of the tests which is defined by this steps method resulting in the determination of an endurance limit ($\sigma_d$) which corresponds to a 50% probability of breaking of the cable at the end of the $10^5$ fatigue cycles.

For this test, a tensile fatigue machine manufactured by Schenck (Model PSA) is used. The useful length between the two jaws is 10 cm, and the measurement is effected in a controlled dry atmosphere (amount of relative humidity less than or equal to 5%, temperature of 20° C.).

II. "Belt" Test:

The "belt" test is a known fatigue test which was described, for example, in applications EP-A-648 891 or WO-A-98/41682, the steel cables to be tested being incorporated in a rubber article which is vulcanized. The principle of this test is as follows.

The rubber article is here an endless belt made from a rubber composition commonly used in the carcass reinforcement of a radial tire. The axis of each cable is oriented in the longitudinal direction of the belt and the cables are separated from the faces of the latter by a thickness of rubber of about 1 mm. When the belt is arranged so as to form a cylinder of revolution, the cable forms a helical winding of the same axis as this cylinder (for example, helix pitch equal to approximately 2.5 mm).

This belt is then subjected to the following stresses.

The belt is rotated around two rollers, such that each elementary portion of each cable is subjected to a tension of 12% of the initial breaking load and is subjected to cycles of variation of curvature which make it pass from an infinite radius of curvature to a radius of curvature of 40 mm (pulley of a diameter of 80 mm), and this over 50 million cycles.

The test is carried out under a controlled atmosphere, the temperature and the humidity of the air in contact with the belt being kept at approximately 20° C. and 60% relative humidity. The duration of the stresses for each belt is of the order of 3 weeks. At the end of these stresses, the cables are extracted from the belts by decortication, and the residual breaking load of the wires of the fatigued cables is measured.

Furthermore, a belt is manufactured which is identical to the previous one, and it is decorticated in the same manner as previously, but this time without subjecting the cables to the fatigue test. Thus the initial breaking load of the wires of the non-fatigued cables is measured.

Finally, the degeneration of breaking load after fatigue is calculated (referred to as $\Delta Fm$ and expressed in %), by comparing the residual breaking load with the initial breaking load.

The breaking-load degeneration thus obtained represents the level of wear by fretting of the cable tested. The higher this degeneration, the more the endurance of the cable with respect to wear by fretting is reduced.

This degeneration $\Delta Fm$ is due in known manner to the fatigue and wear of the wires which are caused by the joint action of the stresses and the water coming from the ambient air, these conditions being comparable to those to which the reinforcement cables are subjected in tire carcasses.

III. Running Test with a Flat Tire:

At a temperature of 20° C., heavy-vehicle tires are caused to roll on a smooth test drum at a reduced inflation pressure and at a given speed, applying to each tire tested the same load which is representative of the load applied to a tire fitted on a heavy vehicle.

More precisely, two series of tests were performed, one at an inflation pressure of 0.50 bar and the other of 0.55 bar.

The criterion for stopping these tests is bursting of the tire, following substantial deterioration of the cables of its carcass reinforcement.

EXAMPLE OF EMBODIMENT OF THE INVENTION

Various wrapped metal cables each corresponding to the aforementioned formula (inner layer of 3 threads and outer layer of 9 threads) were compared:

(3+9).0.18+0.15 with the pitches (in mm):6.5/12.5/ 3.5 and the directions of twist: SSZ.

These cables differ from each other solely by the nature of the material of the wrap with which they are provided and by the number of elementary filament(s) constituting said wrap.

A first "control" wrapped cable is characterized by a metallic wrap formed of a perlitic steel wire of a diameter of 0.15 mm.

A second "control" wrapped cable is characterized by a multifilament textile wrap formed of a spun yarn of a linear density close to 22 tex, which is formed of 100 elementary filaments of an aramid named Kevlar®, each elementary filament having a diameter of approximately 12 μm. These elementary filaments are "overtwisted" (i.e., twisted together) at a coefficient Z100 (twist of 100 turns/meter in the Z direction) and they are sized in known manner.

A third "control" wrapped cable differs from the previous one solely in that said elementary filaments are "overtwisted" at a coefficient Z300 (twist of 300 turns/meter in the Z direction).

A wrapped cable according to the invention is characterized by a textile wrap formed of a single monofilament of a linear density of close of 25 tex (this monofilament having a diameter of 0.15 mm) which is constituted by a thermotropic aromatic polyester.

This polyester is sold by HOECHST CELANESE under the name "VECTRA".

Reference will be made to international patent specifications WO-A-92/12018 and WO-A-98/55674 for the conditions for obtaining this monofilament, which consists essentially of melt spinning of the aforementioned "VECTRA" polyester, followed by a post-polycondensation heat treatment.

This monofilament was sized in the same manner as for the aramid wrap of said second and third "control" cables.

Table 1 hereafter sets forth the mechanical properties of the wrapping wire used for each "control" wrapped cable and the wrapped cable according to the invention.

As far as the metal wrapping wire of the first "control" cable is concerned, the dynamometric measurements, such as the breaking load Fm (maximum load in N), the elongation at break At (total elongation in %) or the initial modulus (cN/tex) are carried out in traction in accordance with Standard ISO 6892 of 1984.

TABLE 1

|  | Wrapping wire | | | |
| --- | --- | --- | --- | --- |
|  | For first "control" cable | For second "control" cable | For third "control" cable | For cable according to invention |
| Density of the wrap material | 7.8 | 1.44 | 1.44 | 1.4 |
| Linear density (tex) | 129 | 22.3 | 22.4 | 25.1 |
| Breaking load, N | 47 (Fm) | 33.2 (BL) | 32.8 (BL) | 53.7 (BL) |
| Te (tenacity, cN/tex) | 36 | 149 | 146 | 213 |
| Elongation at break, % | 2.1 (At) | 2.05 (EB) | 2.09 (EB) | 3.01 (EB) |
| Force under 0.5% (N) | 17 | 7.8 | 7.8 | 6 |
| Initial modulus (cN/tex) | 2630 (at 5%) | 7000 (at 0.5%) | 6780 (at 0.5%) | 4780 (at 0.5%) |

It will be noted that the wrap of thermotropic aromatic polyester according to the invention has a tenacity which is very distinctly greater than the tenacity of a steel or aramid wrap.

Table 2 hereafter sets forth the properties of the "control" cables and the cable according to the invention which have been obtained respectively by means of the wrapping wires detailed in Table 1.

TABLE 2

|  | Weight per unit of length (g/m) | Twisting pitch inner layer (mm) | Twisting pitch outer layer (mm) | Assembly pitch wrap (mm) | Breaking load Fm (N) | Elongation at break At (%) |
|---|---|---|---|---|---|---|
| First "control" cable | 2.293 | 6.26 | 12.5 | 3.5 | 780.5 | 1.88 |
| Second "control" cable | 2.275 | 6.17 | 12.82 | 3.5 | 812.5 | 2.49 |
| Third "control" cable | 2.295 | 6.3 | 13.05 | 3.5 | 808.7 | 2.47 |
| Cable of the invention | 2.292 | 6.15 | 12.62 | 3.5 | 802.2 | 2.48 |

The measurements of breaking load Fm and of elongation at break At for the wrapped cables were carried out under traction in accordance with Standard ISO 6892 of 1984.

This Table 2 shows that the wrap of thermotropic aromatic polyester imparts to the cable according to the invention a force and an elongation at break which are greater than those obtained with a steel wrap (first "control" cable), which is due to a lesser contact pressure during the tensioning of the cable. An improvement in performances in terms of tensile strength and fatigue strength of the cable according to the invention, compared with this first "control" cable, can be deduced from this.

This Table 2 also shows that this wrap according to the invention imparts to the cable incorporating it a breaking load and an elongation at break which are practically analogous to those obtained with an aramid wrap (second and third "control" cables).

Furthermore, three endurance tests were carried out on these "control" cables and the cable according to the invention (see above for the description of each of these tests).

A first endurance test consisted of measuring the endurance limit under undulating traction $\sigma_D$ (MPa) of each of the aforementioned cables.

A second endurance test consisted of measuring the degeneration in wear (in %) by fretting of each of these cables, by means of a "belt" test. More precisely, the wear degeneration of each wire of the inner layer, for each wire of the outer layer, and for all the wires of the cable was measured for each cable.

A third endurance test consisted of measuring the mileage travelled with a flat tire by "control" heavy-vehicle tires and a heavy-vehicle tire according to the invention comprising respectively "control" wrapped cables and a wrapped cable according to the invention in their carcass reinforcements. A reference base 100 was assigned to the mileage travelled by a first "control" tire comprising said first "control" cables (the wrap of which is made of steel), results identified as being greater than 100 indicating a mileage obtained travelling with a flat tire which is greater than that of this first "control" tire, and conversely for results identified as being less than 100.

Table 3 hereafter shows the results obtained for each endurance test.

TABLE 3

|  | Endurance limit $\sigma_D$ (MPa) | Breaking-load degeneration ΔFm | | | Mileage during travel with a flat tire |
|---|---|---|---|---|---|
|  |  | Inner layer | Outer layer | Whole of the cable |  |
| First "control" cable | 700 | 13.2 | 14.5 | 14.2 | 100 |
| Second "control" cable | 735 | 8.5 | 11.3 | 10.8 | 85 |
| Third "control" cable | 727 | 9.5 | 9.9 | 9.8 | 60 |
| Cable of the invention | 744 | 8.6 | 10.6 | 10.1 | 222 |

This Table 3 shows that the wrap of thermotropic aromatic polyester imparts to the cable according to the invention an endurance when travelling with a flat tire which is very significantly improved compared with that obtained with a wrap made of steel or aramid. In fact, the mileage obtained with a wrap according to the invention is increased by more than 120% relative to that obtained with a steel wrap, and by more than 160% compared with that obtained with an aramid wrap.

This Table 3 also shows that the wrap of thermotropic aromatic polyester imparts to the cable according to the invention a fatigue endurance which is greater than that obtained with a steel wrap (endurance limit under undulating traction increased by more than 40 MPa) or even of aramid (endurance limit under undulating traction increased by more than 10 MPa).

This Table 3 furthermore shows that the wrap of thermotropic aromatic polyester imparts to the cable according to the invention a resistance to wear by fretting of the wires of the cable which is substantially improved compared with that obtained with a steel wrap, and which is practically analogous to that obtained with an aramid wrap.

These results were confirmed by observation of the cable according to the invention in cross-section following this fatigue test, which permits confirmation of practically zero wear for the wires of the outer layer of this cable.

The invention claimed is:

1. A heavy-vehicle tire comprising a carcass reinforcement comprising a rubber composition reinforced by a metal cable comprising a textile wrap, wherein said wrap is formed of a material selected from the group consisting of thermotropic aromatic polyesters and thermotropic aromatic polyester amides, and said wrap has a tenacity greater than about 180 cN/tex, an initial modulus greater than about 3500 cN/tex, and a diameter of from about 0.08 mm to about 0.40 mm.

2. The tire according to claim 1, wherein said rubber composition is based on at least one diene elastomer selected from among the group consisting of polybutadienes, natural rubber, synthetic polyisoprenes, butadiene/styrene copolymers, isoprene/butadiene copolymers, isoprene/styrene copolymers, butadiene/styrene/isoprene copolymers and mixtures of these elastomers.

3. The tire according to claim 1, wherein said wrap is formed of a monofilament.

4. The tire according to claim 1, wherein said wrap has an elongation at break greater than about 2.5%.

5. The tire according to claim 1, wherein said wrap is wound on the outer surface of the cable in a pitch of from about 3 mm to about 5.5 mm.

6. The tire according to claim 1, wherein said cable is a multilayer type cable.

7. The tire according to claim 6, wherein said cable satisfies a construction selected from the group of cable constructions consisting of L+M and L+M+N, wherein said constructions comprise an inner layer of L wire(s), surrounded by at least one layer of M wires optionally surrounded by an outer layer of N wires, with L varying from 1 to 4, M varying from 3 to 12 and N varying from 8 to 20.

8. The tire according to claim 7, wherein said inner layer is formed of a unit straight wire, such that said cable satisfies the formula (1+M).

9. The tire according to claim 7, wherein said inner layer is formed of a unit straight wire, such that said cable satisfies the formula (1+M+N).

10. The tire according to claim 7, wherein said inner layer is formed of a plurality of wires which are in a configuration selected from the group of wire configurations consisting of wires parallel to each other and wires wound together in a helix in a finite pitch.

11. The tire according to claim 1, wherein said wrap has a thickness of from about 0.08 mm to about 0.40 mm.

* * * * *